No. 706,409. Patented Aug. 5, 1902.
F. HART.
NUT LOCK.
(Application filed Apr. 30, 1902.)
(No Model.)

WITNESSES:
Jos. A. Ryan
Perry B. Turpin

INVENTOR
Frank Hart
BY Munn & Co.
ATTORNEYS

UNITED STATES PATENT OFFICE.

FRANK HART, OF NEWCASTLE, PENNSYLVANIA, ASSIGNOR OF TWO-THIRDS TO FRANK J. BOLINGER, GEORGE H. BOLINGER, JAMES O. SUTHERLAND, AND JOSEPH CEBERY PERKINS, OF NEWCASTLE, PENNSYLVANIA.

NUT-LOCK.

SPECIFICATION forming part of Letters Patent No. 706,409, dated August 5, 1902.

Application filed April 30, 1902. Serial No. 105,354. (No model.)

*To all whom it may concern:*

Be it known that I, FRANK HART, a citizen of the United States, residing at Newcastle, in the county of Lawrence and State of Pennsylvania, have made certain new and useful Improvements in Nut-Locks, of which the following is a specification.

My invention is an improvement in nut-locks applicable to all classes of machinery and devices wherein it is desired to lock a nut from turning—such, for instance, as rail-joints, bridge structures, &c., threshing-machines, and the like—and the invention consists in the peculiar construction of the locking device, as will be hereinafter described and claimed.

Figure 1:
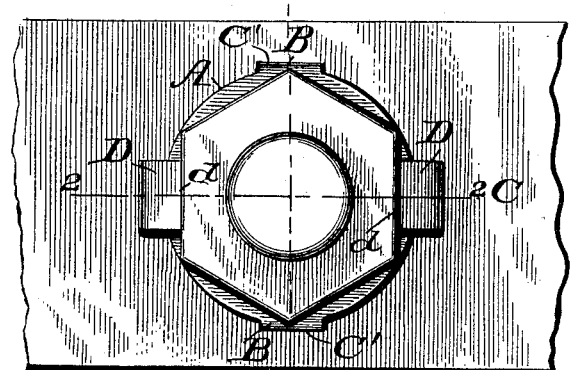
Figure 2:
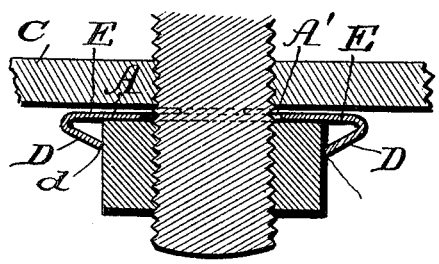
Figure 3:
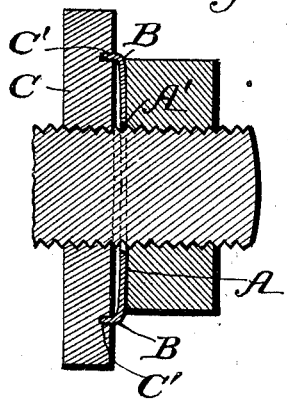

In the drawings, Figure 1 is a face view of the invention as in use, the nut being turned home and locked. Fig. 2 is a cross-sectional view on about line 2 2 of Fig. 1, drawn through the locking-tongues and their shanks. Fig. 3 is a cross-sectional view on about line 3 3 of Fig. 1, drawn through the anchor-lugs; and Fig. 4 is a perspective view of the locking-washer.

By my invention I provide a special construction of locking-washer having anchor-lugs of a special form to lock the washer from turning and also provided with a special construction of locking-tongues connected with the body of the washer by projecting shanks, the whole being so constructed that the anchor-lugs will support the body of the washer slightly away from the face of the abutment against which said washer is applied, so the resilience of the washer may be combined with that of the shanks which connect the locking-tongues with the body of the washer, and the nuts may be forcibly turned to release the lock, and the washer will operate as a spring-washer to compensate for the expansion and contraction of the structure, as well as to prevent any rattling of the nut and hold the same tight at all times. In practice I prefer to make the washer of soft or untempered steel—such, for instance, as that ordinarily used for heavy tin-plate—and the body A of the washer is approximately circular in its general outline, is provided with a central opening A' for the bolt, is provided at diametrically opposite points with the anchor-lugs D, which project at a right angle to the plane of the body A, rest against the abutment C, and preferably in notches or depressions C', forming seats for the said lugs, and the free edges of the anchor-lugs are flat or square and of considerable extent, so they will rest flat against the abutment and distribute the resilience of the body A on opposite sides of the said anchor-lugs or equally between the ends of the washer or body A, which support the opposite locking-tongues D, as shown. By thus supporting the washer away from the face of the abutment the resilience of the washer may compensate for the expansion and contraction of the structure, and this resilience of the washer combines with the resilience afforded by means of the extending shanks E, which support the tongues D in furnishing sufficient resilience in the said tongues and their supporting devices to permit the nut to be forcibly turned back when engaged with the tongues D, as shown in Figs. 1 and 2.

Figure 4:
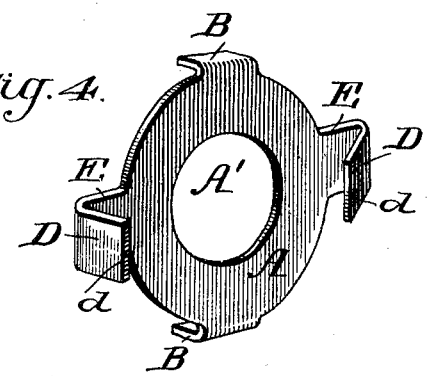

In applying the improvement the washer is fitted over the bolt up against the abutment and with the tongues D turned back slightly to about the position shown in Fig. 4, and the nut is turned home, the tongue standing clear of the path of the nut, so the latter can be readily turned on to its full extent. When the nut is turned home, the tongues D are pressed slightly downward, so their free edges *d* will rest against the face of the nut and will prevent the same from turning off. When this has been done, the parts will occupy the position shown in Figs. 1 and 2, and the nut will be securely locked, as desired. In this position it will be noticed the body of the washer and the shanks E are spaced slightly away from the face of the abutment, affording the cushioning effect desired and also providing for the release of the nut when it is forcibly turned back by the wrench, in which operation the tongues D will yield outwardly away from the nut and the shanks E will yield toward the abutment in such manner as to permit the release of the nut when sufficient pressure is exerted on the wrench.

From the foregoing it will be noticed that I provide a nut-lock in which the locking-tongues occupy a position between the opposite anchor-lugs, and the anchor-lugs are of such length as to space the washer away from the face of the abutment, so the washer will operate as a spring and will supplement the resilience afforded by the projecting shanks E, which support the locking-tongues D, so the washer will operate as a cushion and will supplement the resilience of the said shanks E in permitting the release of the nut by means of the wrench when sufficient force is applied. At the same time the locking device holds the nut in such manner as to prevent the same from jarring loose and operates to prevent any rattling of the nut and to compensate for the expansion and contraction under the influence of heat and cold.

The device is simple, can be easily and cheaply made and applied, and will efficiently serve its purpose.

It will be understood that my invention will be found especially useful in connection with abutments of wood or metal. When used on wood, the anchor-lugs under the pressure of the nut may form their own seats in the face of the abutment, while when used on metal abutments suitable seats may be formed in the face of the abutment for the said lugs.

Having thus described my invention, what I claim as new, and desire to secure by Letters Patent, is—

The nut-lock herein described consisting of the washer having a body portion provided with an opening for the bolt, having the projecting anchor-lugs at its opposite edges of a length sufficient to space said body portion of the washer away from the abutment in the use of the lock, whereby to secure the resilience of the washer and to supplement the resilience of the shanks carrying the locking-tongues, and the opposite locking-tongues and their shanks, said shanks projecting from the opposite edges of the body of the washer and the tongues being returned over the said shanks and inclined with respect thereto, as and for the purposes set forth.

FRANK HART.

Witnesses:
  PERRY B. TURPIN,
  SOLON C. KEMON.